United States Patent [19]

Takatsu et al.

[11] Patent Number: 5,277,236
[45] Date of Patent: Jan. 11, 1994

[54] HIGH-SPEED RADIAL TIRE FOR HEAVY LOAD WITH SPECIFIED BELT CAMBER QUANTITY

[75] Inventors: Mikio Takatsu, Takarazuka; Kiyoshi Ueyoko, Osaka; Hideaki Yoshikawa, Kobe; Yasusuke Yonekawa, Nishinomiya, all of Japan

[73] Assignee: Sumitomo Rubber Industries, Ltd., Kobe, Japan

[21] Appl. No.: 479,414

[22] Filed: Feb. 13, 1990

[30] Foreign Application Priority Data

Feb. 25, 1989 [JP] Japan ................................. 1-44340

[51] Int. Cl.$^5$ ............................ B60C 9/08; B60C 9/18; B60C 9/20
[52] U.S. Cl. ............................ 152/451; 152/454; 152/527; 152/531; 152/538; 152/556
[58] Field of Search ............... 152/454, 526, 531, 451, 152/527, 556, 538

[56] References Cited

U.S. PATENT DOCUMENTS

| | | | |
|---|---|---|---|
| 3,419,059 | 12/1968 | Bridge, Jr. | 152/556 X |
| 3,455,100 | 7/1969 | Sidles et al. | 152/556 |
| 4,263,957 | 4/1981 | Abe | 152/556 |
| 4,454,903 | 6/1984 | Noël et al. | 152/531 |
| 4,807,681 | 2/1989 | Kadota | 152/531 |
| 4,832,102 | 5/1989 | Domchick | 152/556 X |
| 4,890,659 | 1/1990 | Harakon et al. | 152/527 X |
| 4,934,428 | 6/1990 | Aoki et al. | 152/532 |
| 5,085,260 | 2/1992 | Ueyoko et al. | 152/556 X |

FOREIGN PATENT DOCUMENTS

0331453 9/1989 European Pat. Off. ............ 152/454

Primary Examiner—Michael W. Ball
Assistant Examiner—Adrienne C. Johnstone

[57] ABSTRACT

A high speed radial tire has a carcass and a belt layer, wherein; in the state of inflated with a standard internal pressure on a standard rim, a equator height H1 defined as a height of crossing point at which the inner surface of the belt layer intersects the surface of the tire equator is larger than an outer end height H2 defined as a height of the outermost end of the inner surface of the belt layer. Furthermore, a belt camber quantity H defined as a difference between the height H1 and the height H2 is set at 6% or more of the belt width W.

6 Claims, 7 Drawing Sheets

100% Load
(Internal pressure
15.5 Kg/cm²)

FIG.6(B)

200% Load
(Internal pressure
15.5 Kg/cm²)

HIGH-SPEED RADIAL TIRE FOR HEAVY LOAD WITH SPECIFIED BELT CAMBER QUANTITY

BACKGROUND OF THE INVENTION

The present invention relates to a high-speed radial tire for heavy load which improves the critical speed of generating standing waves and the durability of a bead part.

Since the size and the flight speed of aircraft have been increased, the operating speed and the acting load of tires have been increased, and therefrom, a larger durability is required in high-speed radial tires for heavy load, especially in tires for aircraft, for a safe take-off and landing.

A tire for aircraft must meet various characteristics as mentioned below as well as tire durability, including every part of the tire such as wear resistance, resistance to rolling, low heat generating characteristics and the like.

1. To possess a resistance against a succession of large deformations, since the deformation quantity of the tire is significantly as large as 28 to 38%, for example, in a loaded state, in order to effectively lower the shock when an aircraft takes off or lands on a lading strip.
2. To possess a resistance against a high-speed rotation in a heavy load and a large deformation, since the take-off and landing speed has been increased due to the flight ability of aircraft at higher speed.
3. To be able to resist taxiing conditions when moving between the landing strip and the gate, where a large load acts for a relatively long time in spite of lower speed.
4. To posses resistance against a load of approximately 130 to 360 times (approximately 50 times in normal tire) per unit weight of tire due to lightening of the aircraft, and a significantly high internal pressure such as 10 to 16 kg/cm² created thereby.

On the other hand, as such a tire for aircraft, having a cross-ply construction in which carcass cords are placed to mutually cross between the plies are widely used. However, due to their smaller rigidity in tread part and heavier weight as well as wear resistance and heat generating characteristics, such tires are not preferable, and those having a cross-ply construction are limited in their use because of a remarkably improved performance of recent large-sized jet-propelled aircraft.

Therefore, recently, radial tires having a belt layer composed of belt cords with a high elasticity inclined at a small angle against the equator of the tire placed outside in the radial direction of the carcass in so-called radial or semi-radial construction where carcass cords are placed in a row in the radial direction of the tire are gradually used.

However, it has been found that such tires for aircraft with a radial construction have a relatively lower durability in the bead part compared with the durability of the entire tire. It has also been found that standing waves tend to be generated at a relatively high rate.

Figure 8:
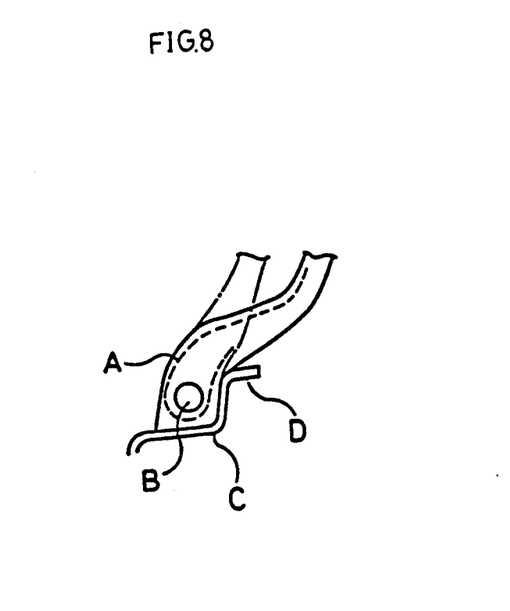
FIG. 8 is a diagram showing an example of deformation in the bead.

In regard to the durability in the bead part, since deforming quantity in the radial direction of the tire upon loading is as large as approximately 28 to 38%, as mentioned before, compressive stress acts on the carcass cords of the carcass A in the bead part, and in the folded part about the bead core B, as shown in FIG. 8, and it is evident that in the inside, in the direction of tire's axis, a tension which tenses the carcass cords is generated.

On the other hand, it has been found that damage to the bead part occurs near the top end of the rim flange C. From the results of a drum test, it was found that as the bead part bends to the top edge D in the top end of the rim flange C extending outward to the tire's axis, a compression is created by the rapid bending in this part, which generates a centralized compressive stress such that the part is broken by fatigue accompanied by a succession of compressive strains caused by the large compressive stress which acts on the carcass cords of the part, and that as the broken end promotes the centralization of compressive stress in a specific part, damage to the bead part is generated. This bending increases the contact pressure of the bead part in the top edge D, and as the contact pressure increases, the compressive stress and the damage increases.

Moreover, the standing wave is a wave phenomenon in the tread part of a tire while driving, and such waves in the tread part cause a deterioration in the tire's durability, especially by exciting the bead part through the side-wall part of the tire.

In a heavy-loading, high-speed radial tire for aircraft, as mentioned before, since the deformation is significant and the take-off and landing speed is high, exceeding 300 km/h, such standing waves tend to be generated. As generally known, standing waves in a radial tire can be obtained from the following formula (1).

$$Vc = \sqrt{T/m + 2\sqrt{EI \cdot K/m}} \quad (1)$$

where
- Vc: critical speed of standing wave generation;
- m: mass of unit length in the tread part;
- EI: bending rigidity in the tire's surface, in the tread part;
- T: tension of belt; and
- k: spring constant of carcass.

The formula (1) was obtained by supposing the belt layer as an infinite beam supported elastically by the carcass, and it is known that in order to improve the critical speed Vc of generating standing waves, the mass m should be lowered and the rigidity EI, tension of belt T and spring constant of the carcass k should be increased.

Meanwhile, in order to increase the specified frequency of the belt and to improve the critical speed Vc of generating standing waves without decreasing the mass m, it was proven that a larger tension T should be applied to the belt by filling the tire with an internal pressure, and thereby the apparent bending rigidity EI in tire's surface in tread part is increased and the critical speed Vc is improved.

In addition, while in the formula (1), it is supposed that an equal tension T acts on the belt layer, it was also found by experiments that by applying a larger expansion especially in the equatorial part of a tire, that is, the crown part of the tread part, it is effective to improve the critical speed of the standing waves and that the tension of the belt T in this part is relatively increased.

For this purpose, the radius of the inner circumference of the tread part, especially that of the belt layer is preferably set at a smaller length and the belt camber quantity at a larger quantity compared with conventional tires. In the case that the radius of the side-wall part is mainly set approximately at the same length as in conventional tires, this helps to lower the contact pressure with the flange of the bead part, and it is also proves that this improves the durability of the bead part.

Moreover, in addition to the above, it was found that an increase in expansion in the crown part helps to standardize the distribution of ground contact pressure in the tread surface.

SUMMARY OF THE INVENTION

It is hence a primary object of the present invention to provide a high-speed radial tire for heavy load which can improve the durability of a bead part and the critical speed of generating standing waves.

According to one aspect of the present invention, a high-speed radial tire for heavy load comprises a carcass composed of at least one carcass ply having carcass cords inclined at an angle of 70 to 90 deg. against the tire's equator, which extends from a tread part through a side-wall part to a bead part and is folded around a bead core in each of two bead parts, and a belt layer composed of a plurality of belt plies which are placed outside in the radial direction of the carcass and inside the tread part, wherein, in a state of being mounted on a standard rim and filled with a standard internal pressure, the height in the radial direction at the crossing point of the inner surface of the belt layer in the radial direction and the surface of the tire's equator, that is, the equator height H1 is larger than the height in the radial direction at the outermost end of the inner surface in the tire's axis direction, that is, the outer end height H2, and the difference between the equator height H1 and the outer end height H2, (H1−H2), that is, the belt camber quantity H is set at 6% or more of the belt width W which is the length between the outer ends of the inner surface of the belt layer in the tire's axis direction.

Figure 1:
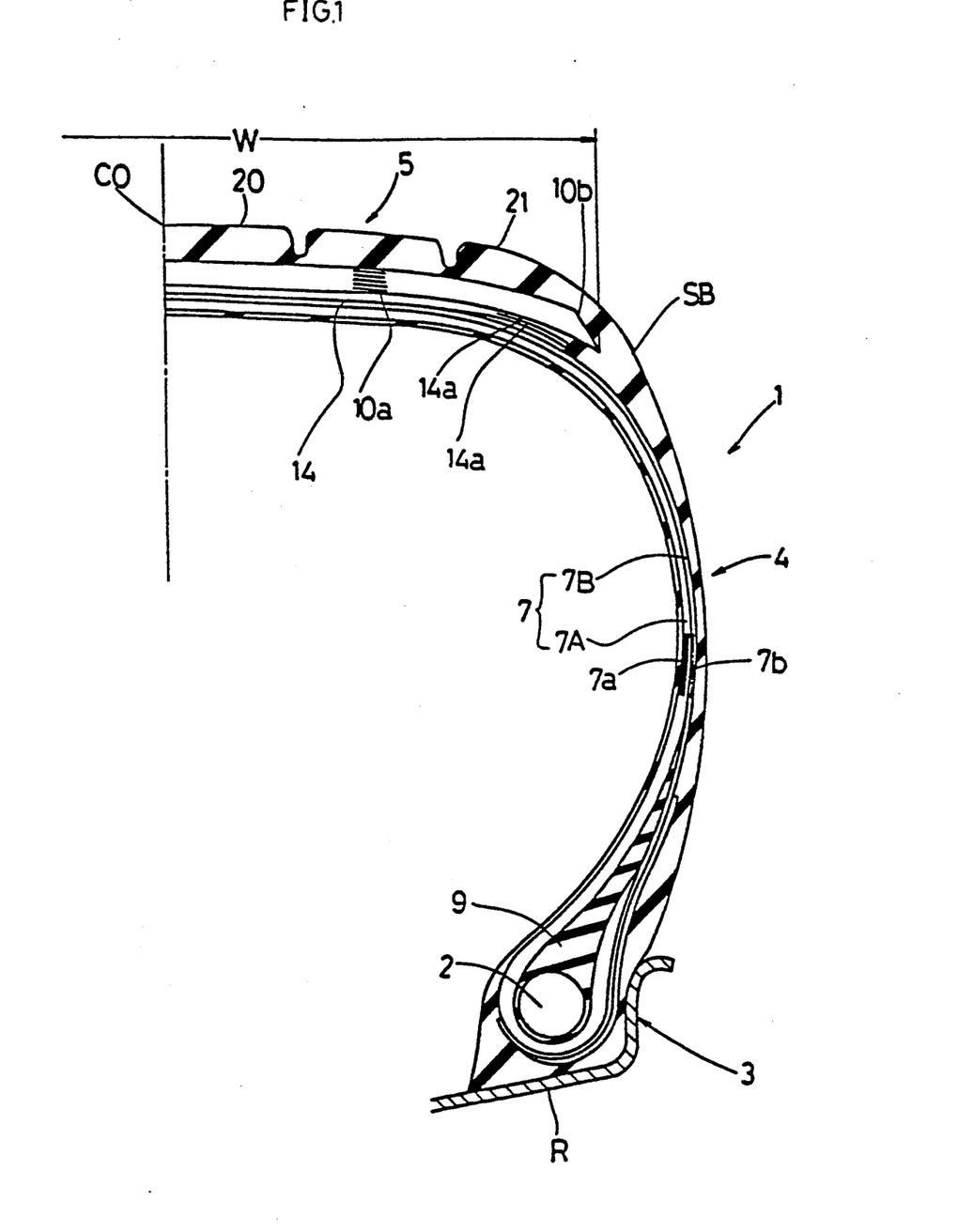
FIG. 1 is a sectional view showing one of the embodiments of the present invention.
Figure 2:
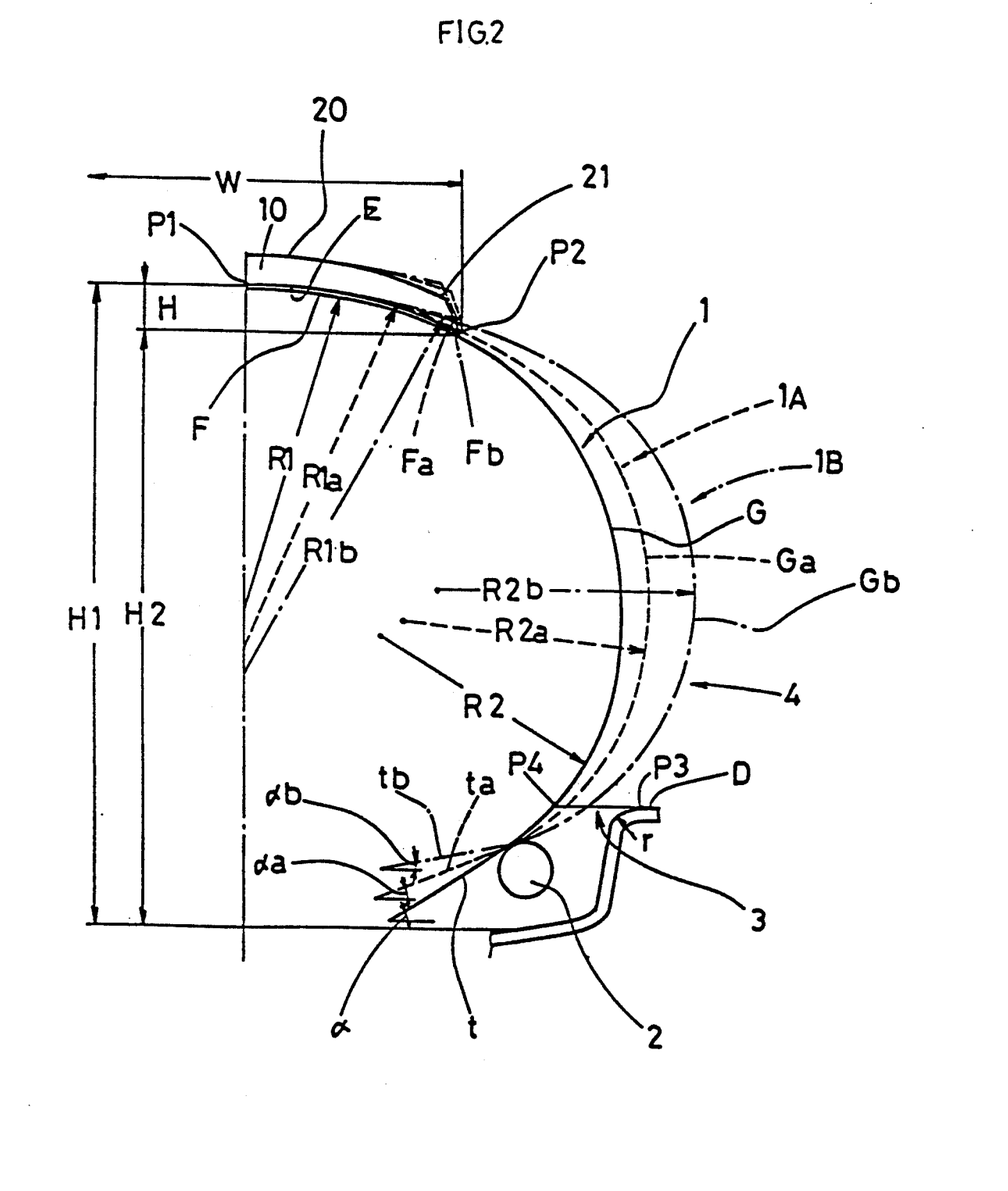
FIG. 2 is diagrams showing characteristics of a breaker and a carcass in comparison with a conventional tire.

As the sectional view of a right half of a tire is shown in FIG. 1 and a belt layer and the center line of a carcass in FIG. 2 compared with a conventional tire, the belt camber quantity H of a tire 1 in such a standard state, that is, mounted on a specified rim and filled with a specified internal pressure is set at 6% or more of the belt width W. By thus setting, in the inner surface E of a belt layer 10, as a carcass 7 is curved along the inner surface E, the radius of curvature R1 passing the inner surface F of the center line of the carcass 7 along the inner surface E is smaller compared with radii of curvature R1a and R1b of the curved surfaces Fa and Fb in conventional tires 1A and 1B shown by a dotted line and a single-dot broken line in FIG. 2. As a result, in the tire 1 of the present invention, a crown part 20 extends relatively outward compared with a shoulder part 21, and thus, a belt tension T generated by centrifugal force in the crown part 20 acting at high-speed rotation becomes relatively larger than the belt tension T in the shoulder part 21 due to a larger radius.

Such an increase in belt tension in the crown part 20 improves, as mentioned before, the critical speed for standing waves as well as controlling their generation.

In addition, by thus reducing the radius of curvature R1, the curved surface G with a radius of curvature R2 smoothly continuing to the curved surface F with the radius of curvature R1 along the inner surface E of the belt layer 10 and continuing from a side-wall part 4 to a bead core 2, settles more inward in the tire than the curved surfaces Ga and Gb of the conventional tire, and the angle formed by a tangent line t contacting the bead core 2 and the surface becomes larger for standing up the tangent compared with tangent lines ta and tb of the conventional tire. This is because the curved surfaces G, Ga and Gb are set as curves smoothly continuing between the curved surfaces F, Fa and Fb and a bead part 3 based on the natural equilibrium theory, and thus, the curved surfaces F, Fa and Fb have approximately the same radii of curvature R2, R2a and R2b.

Therefore, upon the bending of the bead part 3 by a deformation of the bead part 3 caused by a load on the tire, since the curved surface F of the carcass 7 presents inward in the tire, compared to the carcass of a conventional tire, the bending of the top edge D in the top end of the rim flange C parallel to the direction of tire's axis is reduced and the bending rate is lowered. This enables a lowering of the contact pressure with the top edge D. Such reduction in contact pressure between the bead part 3 and the rim flange reduces the bending stress caused in the bead part, thus reducing the compressive stress acting on the folded part of the carcass caused by the bending stress, and thereby improving the durability of the bead part.

Furthermore, in the case elastic cords having a large expandability by load are used as carcass cords, tension can be added to the carcass cord, as well as an internal pressure, by previously applying a high expansion. Such a tension reduces the compressive stress acting on the carcass cord in the part of rim flange of the bead part. Therefore, the generation of stress in a specified part by deformation accompanied by compression and even breakage by fatigue can be prevented, thus preventing the generation of a successive centralization of stress in the bead part, and thereby improving the durability of the bead part.

Moreover, by filling to a specified internal pressure, the expansion of the tread part comes to be larger especially in the crown part 20, which increases the tension T of the belt layer in this part and improves the apparent rigidity EI of the tread part, and thereby, the critical speed of generating standing waves is further improved and the generation thereof is controlled. Thus, the successive stress in the bead part and the deformation which transmits the standing waves through the side-wall part to the bead part can be prevented, and the durability of the bead part is improved.

In a conventional physical characteristic of a cord, in addition to the compressive stress in the sectional direction of the folded part of the carcass cord in the bead part, a complex stress was applied by standing waves, but by preventing the standing waves, in the case an elastic cord is used, the durability of the bead part is further improved.

BRIEF DESCRIPTION OF THE DRAWINGS

An embodiment of the present invention will now be describe by way of example, referring to the attached drawings, in which.

DETAILED DESCRIPTION OF THE INVENTION

The tire 1 shown in FIG. 1 is a 46×17R20 radial tire for aircraft which is mounted on a standard rim R and filled with standard internal pressure, wherein the tire 1 comprises a bead part 3 in which a bead core 2 passes, a side-wall part 4 continuing to the bead part 3 and extending outward in the radial direction of the tire and a tread part 5 connecting the outer end of the side-wall part 4.

In addition, in the tire 1, a carcass 7 having an inner layer 7A composed of plural, for example, four carcass plies 7a folding the bead core 2 of which the sectional surface is approximately circular from the inside to the outside of the tire, and an outer layer 7B composed of plural, for example, two carcass plies 7b and 7b surrounding the folded part of the inner layer 7A and folding it from the outside to the inside of the tire is constructed. Each of the carcass plies 7a and 7b is positioned in the radial direction to the tire's equator CO with an inclination of 70 to 90 deg., and in the carcass 7 of the embodiment, carcass cords are mutually crossed and inclined against the radial direction of the tire between the adjoining carcass plies.

Over the bead core 2, a bead apex 9 composed of a tapered rubber extending in the radial direction of the tire is formed to improve the rigidity and disperse a stress caused by the bending of the folded part of the carcass. In the outer surface of the bead part 3, a chafer (not shown) may be formed to prevent the rim from dislocating.

In the tread part 5, a belt layer 10 is constructed outside in the radial direction of the carcass 7 inside the tread part with an inclination of the cord of 0 to 20 deg., preferably 0 to 5 deg. against the surface of the tire's equator, and in the embodiment, between the belt layer 10 and the carcass 7, one or more layers of cut breakers 14 are positioned with an inclination of cords of 5 to 40 deg. against the surface of the tire's equator, which improve the cornering force characteristic. By forming the cut breaker plies 14 outside the belt layer 10, they improve the cornering force and function also as a protective layer for the belt layer 10. They may be formed both inside and outside.

Moreover, the belt layer 10 is composed of plural, for example six to ten plies 10a, and by forming the belt plies 10a to gradually narrow in width outward in the radial direction, the belt layer 10 forms a pedestal shape in a sectional surface including the tire's axis and the side surface 10b forms an inclined surface approximately along the outer surface SB of a tire buttress part. The width W of the belt layer 10, that is, the maximum width of the belt layer 10, which is the width of the innermost ply 10a in the embodiment, is set at approximately 75 to 85% of the entire width of the tire.

In the invention, in FIG. 2, the equator height H1, which is a height from the bottom surface of the bead in the radial direction at a equator point P1 where the inner surface E of the belt layer in the radial direction crosses the equator surface of the tire CO, is larger than the outer height H2, which is a height in the radial direction at the outermost point of the inner surface in the direction of tire's axis and, thereby, at an outer end point P2 of the belt 10, and the difference between the equator height H1 and the outer end height H2, (H1−H2), that is, the belt camber quantity H, is set at 6% or more of the belt width W which is the length between the outer end points P2 and P2 in the direction of tire's axis.

This is different from the fact that the ratio of the belt camber quantity H to the belt width W is set at 5.5% or less in a conventional high-speed radial tire for heavy load.

In the tire 1, by such settings, the radius of curvature R1 of the curved surface F of the center line passing through the middle position of the thickness of the carcass 7 along the inner surface E of the belt layer 10 comes to be smaller than the radii of curvature R1a and R1b of the curved surfaces Fa and Fb of a conventional tire where the camber quantity H is smaller, as shown by a dotted line and a single-dotted broken line in FIG. 2.

As mentioned before, by this construction, the crown part 20 extends relatively outward in the radial direction compared with the shoulder part 21, and the tension T generated by a centrifugal force in the central part 20 in a high-speed rotation of the tire relatively increases compared with the shoulder part 21. This is used to improve the critical speed of generating standing waves.

The tire 1 having the belt layer 10 with such a small radius of curvature R1 is formed by molding using a vulcanizing mold with a relatively small radius of curvature in the formed part of the tread surface.

In addition, in regard to the carcass 7, its vulcanizing mold is established so that a smooth curved surface is formed between the outer end point P2 and the bead core 2 based on the natural equilibrium theory. Thus, the radius of curvature R2 of the curved surface G centralized by the side-wall part 4 in the tire of the invention based on the natural equilibrium theory and the radii of curvature R2a and R2b of the curved surfaces Fa and Fb of conventional tires 1A and 1B based as well on the natural equilibrium theory have approximately an equal size, and therefore, the curved surface F of the carcass 7 of the tire 1 of the present invention settles more inward in the direction of the tire's axis compared with the curved surfaces Fa and Fb of conventional tires.

As the curved surface F of the carcass 7 locates inward in the direction of tire's axis, as mentioned before, the curved surface f stands up more compared with the curved surfaces Fa and Fb of conventional tires, and thus, the angle α formed by a tangent line t contacting the bead core 2 and a line in the direction of the tire's axis comes to be larger compared with angles α a and α b formed by tangent lines ta and tb of the conventional tires 1A and 1B.

It is evident that such a standing state keeps the curved surface F off a flange F of a rim R. As a result, the tire 1 of the invention in such a state that it is mounted on a specified rim R and filled with a specified internal pressure, in the case of bending upon loading, obviously reduces the contact pressure at the top end of the rim flange C compared with a conventional tire.

Figure 3:
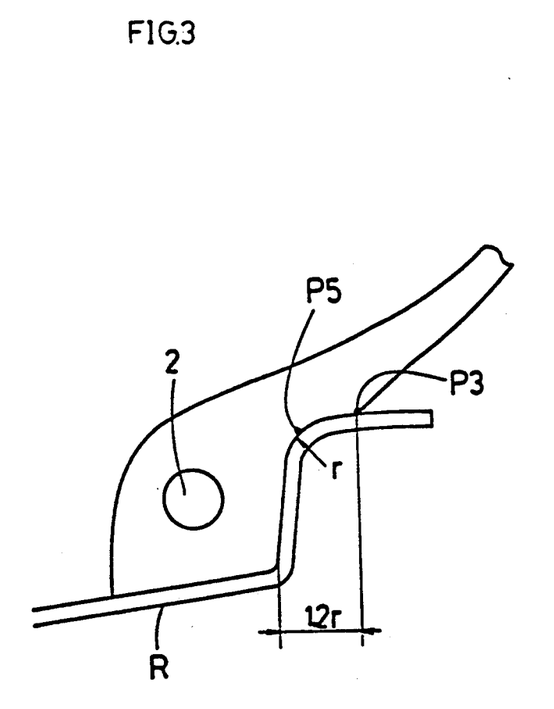
FIG. 3 is a sectional view showing the bead part, FIGS. 4(A) and (B) are diagrams showing the characteristics of cords.

As shown in detail in FIG. 3, in the top edge D formed horizontally through an arc of a radius of curvature r on the top end of the rim flange C, it is preferable that the contact pressure at the point P3 having a distance of 1.2 times of the radius of curvature r is set at 30 kg/cm² or less, when a double of a specified load is loaded. By such a reduction of the contact pressure, in a folding deformation, a bending acting on the bead part 3 based on a reversing force by the contact pressure acting on the folded part and the compressive stress acting on the carcass cord can be reduced, and the durability can be improved.

As mentioned above, by setting the belt camber quantity H at 6% or larger quantity of the belt width W, it becomes easier to set the contact pressure at 30 kg/cm² or less, and in order to obtain such contact pressure, bending rigidity of the bead strengthening part such as bead apex 9 is adjusted.

The radius of curvature R1 to obtain the standing status can be obtained from the belt camber quantity H and the belt width W.

As a result of reducing the radius of curvature R1, as shown in FIG. 2, a carcass cord path 1 of one side which is the length in the sectional surface of tire's axis in the carcass 7 from the crossing point P4 of a line in the direction of tire's axis passing the upper surface of the top edge D of the flange F to the tire's equator CO is reduced approximately to 1.5 to 4%, preferably to 2.5 to 3% compared with a conventional tire.

By employing an expansion in the middle of the shape of tread in the tire, the shape of the ground contact surface is improved as a result.

From these points of view, the ratio is set at 6% or more. But if the ratio exceeds 20%, the tire's equator part CO is convexed, which tends to cause a deviated wear and a difficulty in production. Therefore, the range is 6% or more, preferably 20% or less, and more preferably 11% or less and 7% or more.

An elastic cord having a high expandability is used as a carcass cord.

The elastic cord has the stretch $S_5$ (%) of 5 or more and 10 or less (preferably between 5 and 8) upon 5 kg loading. Moreover, the stretch $S_{10}$ (%) is 9 or more and 15 or less (preferably between 10 and 12) upon 10 kg loading, and the stretch $S_{20}$ (%) between 14 to 20 upon 20 kg loading.

In a carcass cord of the other embodiment, the divided value $D_5$ of the stretch $S_5$ by the actual total denier number of the cord is set at $7.35 \times 10^{-4}$ or more and $14.7 \text{ kg} \times 10^{-4}$ or less. The divided value $D_{10}$ of the stretch $S_{10}$ upon 10 kg loading by the actual total denier number of the cord and the divided value $D_{20}$ of the stretch $S_{20}$ kg loading by the actual total denier number of the cord are $13.2 \times 10^{-4}$ to $22.1 \times 10^{-4}$ and $20.5 \times 10^{-4}$ to $29.4 \times 10^{-4}$, respectively.

Meanwhile, the measuring method of the actual total denier number of the cord is as follows;

A sample is accurately taken by applying the initial load to the cord so that the total length comes to be 9 m or longer.

The mass is measured, the absolute dry mass is obtained by leaving it for two hours or more in a dryer at a temperature of 105° C. ±2° C and drying it cones to have the constant weight, and the fitness based on corrected weight is calculated from the following formula;

$$\text{Actual total denier number } d = \frac{W' \times 9000 \times (1 + Rc/100)}{l}$$

where
W': absolute dry mass of the sample
Rc: official region (nylon 4.5%)

Figure 4A:
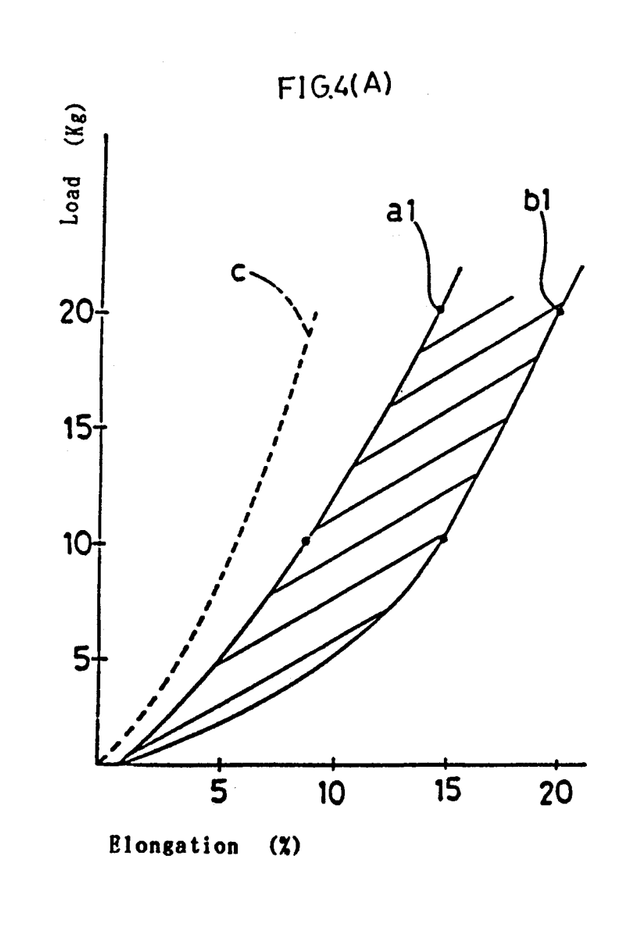
Figure 4B:
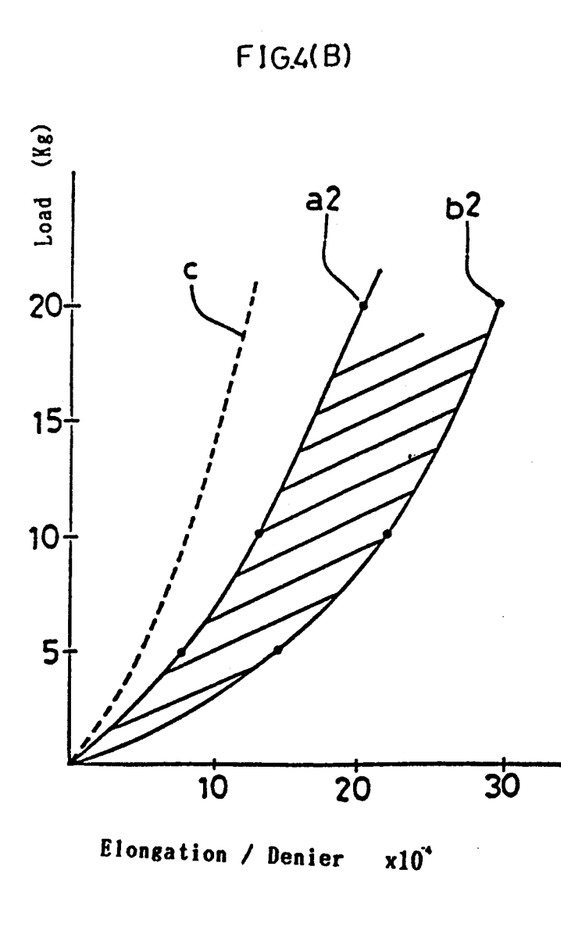

Such elastic cords, in FIGS. 4(A) and (B), have such characteristics that put between curves a1 and a2 of the lowest limit and curves b1 and b2 of the highest limit. As known from the curves a and b (combining the curves a1 and a2 to call the curve a, and the curves b1 and b2 to call the curve b), the elastic cords have such a characteristic that the stretch is larger with a smaller load and the stretch ratio decreases as the load increases.

By using elastic cords having such a characteristic, in the initial stage fulled with an internal pressure, a larger stretch is created in the carcass cords.

When the load increases to 10 kg and then to 20 kg, the carcass cord stretches as the load increases, while the stretch ratio reduces accordingly.

As shown with a curve c, since conventional cords form a curve standing more compared with the curve a and approximately in a linear shape, when such conventional cords are used, the stretch of carcass cord is smaller even by filling with an internal pressure, and they are inferior in softening the acting compressive stress in deformation.

In comparison with this, since the elastic cord has a characteristic put between the curve a and the curve b, it can improve the durability of the tire.

The standards on the stretches $S_5$, $S_{10}$ and $S_{20}$ upon 5 kg loading, preferably 10 kg and 20 kg specify the stretching quantity itself of the cord upon loading, regardless of the denier number of the carcass cord used. While the other standards specify the divided value of the stretch $S_5$ upon 5 kg loading by the denier number, thus specifying the stretch per denier upon 5 kg loading, and thereby, meaning the stretch ratio per denier of the second cord upon 5 kg loading, and therefore, the former judging the carcass cord mainly from the characteristic of the cord, and thereby, adopted in a wide range of high-speed tires for high load including tires for aircraft and specifying only the stretch upon a specified load specifies the value which can be preferably used mainly in tires for aircraft and tires for large-sized jet-propelled aircraft.

In addition, the initial elasticity Es (kg/mm) of the elastic cord should be 130 or more (preferably 140 or more) and 200 or less.

Figure 5:
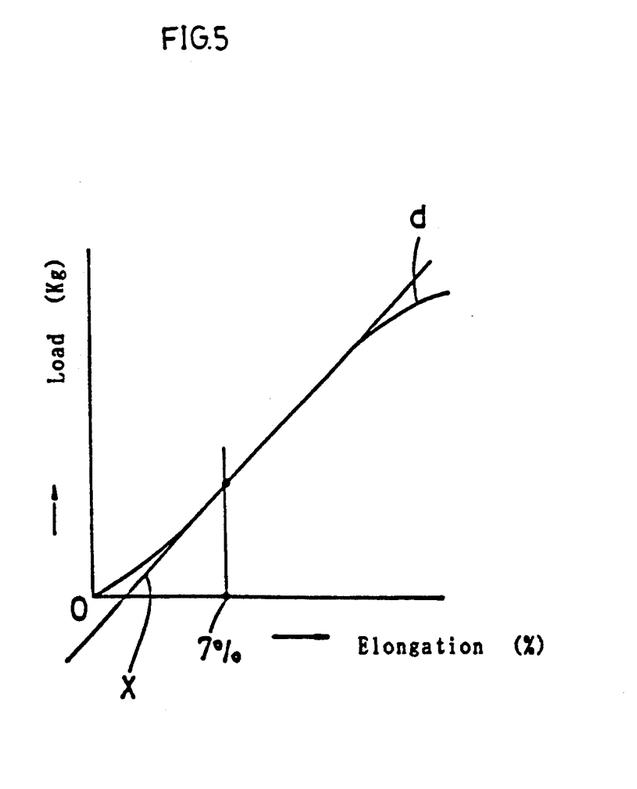
FIG. 5 is a diagram explaining the initial elasticity, FIGS. 6(A) and (B) are diagrams showing the deformation profile.

The initial elasticity Es (kg/mm²) is defined, as shown in FIG. 5, as gradient of the tangent line X of the curve d at the stretch of 7%, by drawing the curve d of load (kg) and stretch (%) by using a tensile tester of constant-rate extension type, and by setting the initial elasticity Es (kg/mm²) at a smaller rate within the range compared with a conventional cord, the stretchability of the elastic cord can be improved and a stretch can be added to the carcass cord.

Furthermore, as an elastic cord, one or plural types of cords out of nylon cord, polyester cord, aromatic polyamide cord, carbon cord and metallic cord are combined.

A cord having such physical characteristics can be obtained, when using an organic fiber cord, by widely reducing the tension in so-called dip-stretch where a tension and heat are pri-applied to a cord for a specified time in comparison with the tension used in the conventional dip-stretch. In order to increase the characteristics, when using a nylon cord, for example, the number of twists per 10 cm is increased to 26 to 36 T/10 cm from the conventional number of twists of approximately 23 T/10 cm. It is also possible to reduce the stretchability as a whole cord by combining cords with smaller stretchability and those with larger stretchability and applying a sagging to the cords with smaller stretchability by previously coiling it so that it would bear the load, when the load reaches a specified value.

By using such an elastic cord as a carcass cord, the belt layer 10 can be bulged out, when inflated with a specified internal pressure, and the aforementioned belt camber H can be more easily obtained.

The carcass plies 7a and 7b are formed by burying the carcass cord in base rubber. As the base rubber, such material that allows the characteristics of the cord in addition to strengthening and low heat-generating characteristics are used. For this purpose, base material made of one or two types of natural rubber and synthetic isoprene rubber is mixed with 50 to 70 parts by weight of carbon, and those having 30 to 70 kg/cm$^2$ of 100% modulus and 200% or more and 500% or less of elongation at breakage can be preferably used. In the case of less than 50 parts by weight of carbon, the strengthening performance tends to deteriorate, and in the case it exceeds 70 parts by weight, more heat tends to be generated. When the 100% modulus is less than 30 kg/cm$^2$, the heat generating characteristic tends to be increased, and when it exceeds 70 kg/cm$^2$, the strengthening performance tends to deteriorate. When the elongation at breakage is less than 200%, as the carcass is inferior in following its strain, the rubber breakage tends to occur, and when it exceeds 500%, the heat generating characteristic tends to be increased.

Thus, by previously applying a larger stretch compared with a conventional tire, upon bending of the bead part 3 in take-off or landing of aircraft, the compressive stress of the carcass cord generated at the side of the rim flange C is reduced, then the compressive strain is reduced, and thereby, a deformation, a partial bending and breakage based on fatigue caused by the compressive strain are prevented. In addition, the compressive stress of the rubber itself in the bead part 3 can be lowered, and the durability of the bead part can be improved, for example, in more than 10%.

As the belt cord 11, as well as the cut breaker cord, materials having the same characteristics as the carcass cord in the changes of stretch by load, and the belt cord 11 should have smaller stretch $S_5$ (%) upon 5 kg loading than the carcass cord at 3 to 6 and the divided value $D_5$ (%/d) of the stretch $S_5$ (%) by the actual total denier number (d) at $3.85 \times 10^{-4}$ to $7.69 \times 10^{-4}$. As the carcass cord, those having similar characteristics to belt cord are used. Cords made of different materials may also be used.

The belt cord 11 and the cut breaker 14 are buried in the same base rubber to form belt plies 10a and 10b and a cut breaker ply 14a.

As the belt cord 11 and the carcass cord, a relatively thick cord with the same diameter d11 such as 1260d/2 to 2700d/3 is used, and as a sub-cord, those having the same or smaller diameter are used.

In addition, the belt layer 10 may also be formed as an endless type by the so-called cord winding method where one or several cords are wound in a spiral shape.

EXAMPLE 1

Prototypes of tires having a tire size of 46×17R20 and a structure as shown in FIG. 1 were produced in specifications as shown in Table 1. The symbol A of the ply composition in the table shows the type of ply composition in Table 3. In Table 3, as cut breaker cords, the same cords as used for belt cords were adopted. Each tire was filled with a specified internal pressure, and the durability was tested based on the taxi simulation test according too the U.S. Civil Aviation Bureau's standard TSO-C62c. The results are shown by values in the table. The numeral 61 means that the tire run the entire distance. Those that could bear a take-off with 200% of load are marked with a circle. In tires of the embodiment 2 and comparative Examples 1 and 2, the rising of the temperature was measured at the crown part, shoulder part and bead part in running with 100% of load and at a speed of 300 km per hour. In each case, a thermocouple was inserted in the middle of the thickness, and the temperature after driving one hour was measured. The temperature in the bead part is lower in the embodiment 2.

In addition, the revolving speed was changed, and the critical speed of generating standing waves was obtained. The embodiments could attain a speed of approximately 300 km/h. The results are shown by indices, setting the index of the comparative example 1 at 100, and the higher scores show higher critical speeds.

Figure 6A:
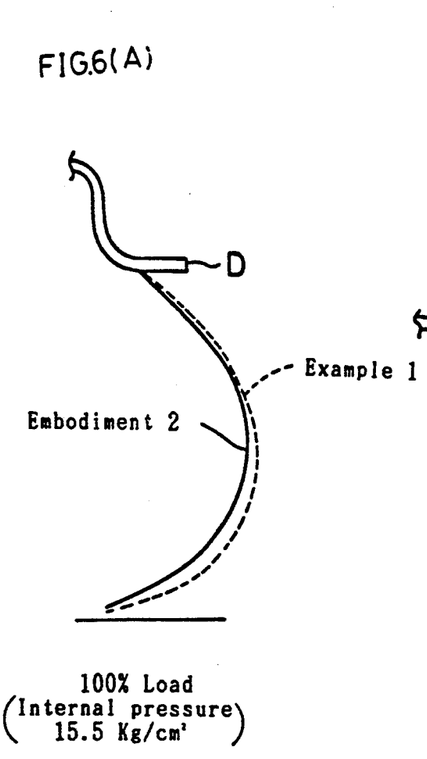
Figure 6B:
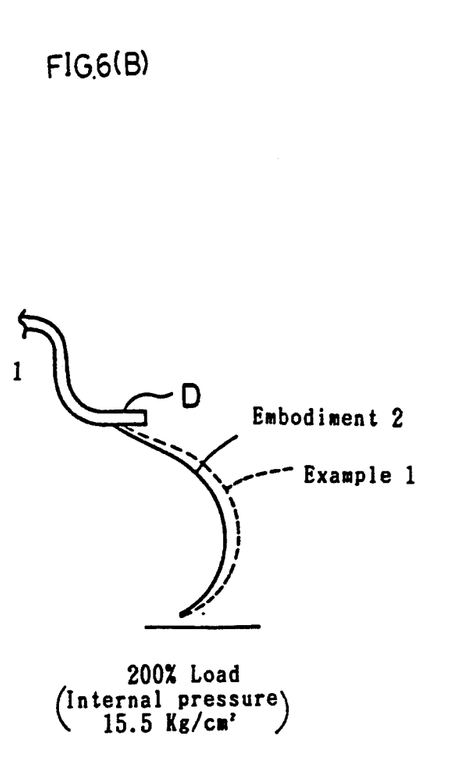
Figure 7:
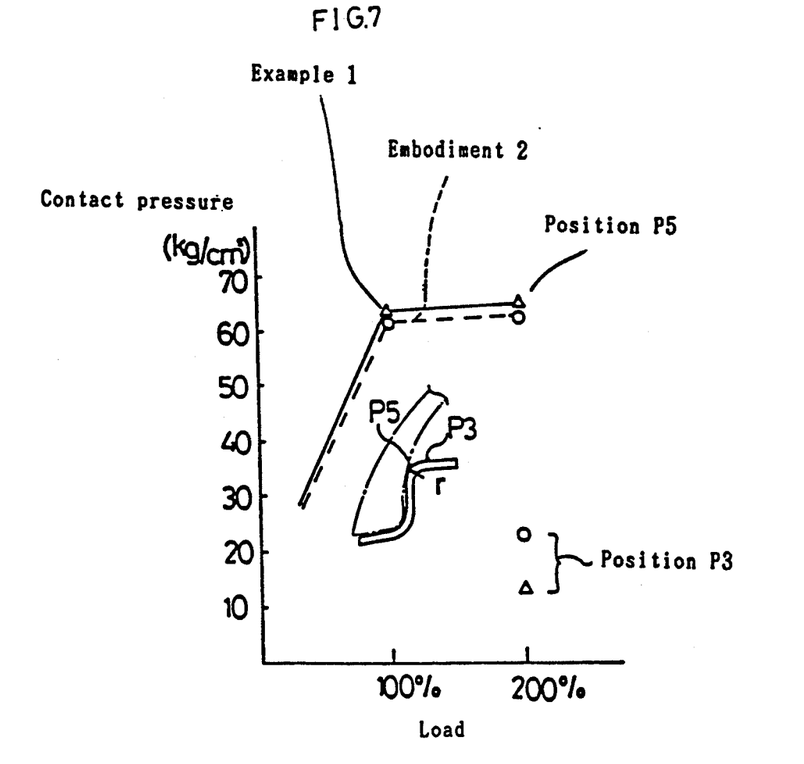
FIG. 7 is a diagram showing an example of measured results of the contact pressure.

Furthermore, deformation profiles of the embodiment 2 and the comparative example 3 with 100% and 200% of load are shown in FIGS. 6(A) and (B), and the contact pressures at the point P3 in rim flange and the point P5 in the middle of the arc r are shown in FIG. 7.

It is known that the embodiments show slightly standing shapes and are lower in contact pressure.

EXAMPLE 2

Prototypes of tires of the embodiments 4 to 7 were produced by using plies having specifications of B to F in Table 3, and the results of the same test are shown in the table.

Thus, a tire of the invention improves the durability of the bead part as well as increasing the critical speed of generating standing waves and controlling their generation, thereby, to improve the durability of the bead part.

TABLE 1

|  | Embodiment 1 | Embodiment 2 | Embodiment 3 | Comparative example 1 | Comparative example 2 |
|---|---|---|---|---|---|
| Ply composition | A | A | A | A | A |
| Radius of curvature R1 mm | 350 | 360 | 370 | 380 | 400 |
| Radius of curvature R2 mm | 120 | 120 | 120 | 120 | 130 |
| Cord path ** | 400 | 406 | 410 | 414 | 426 |
| (H1-H2)/W % | 8.5 | 8 | 7 | 5.5 | 5 |
| Standing wave characteristic | 110 | 110 | 104 | 100 | 93 |
| Durability | ○ | ○ | ○ | 61 | 61 |
| Temperature rise  Crown part | — | 79 | — | 80 | 88 |
| Shoulder part | — | 71 | — | 72 | 55 |
| Bead part | — | 70 | — | 73 | 78 |

TABLE 2

|  | Embodiment 4 | Embodiment 5 | Embodiment 6 | Embodiment 7 |
| --- | --- | --- | --- | --- |
| Ply composition | B | C | D | E |
| Radius of curvature R1 mm |  |  | 360 |  |
| Radius of curvature R2 mm |  |  | 120 |  |
| Cord path/2 |  |  | 406 |  |
| (H1-H2)/W % |  |  |  |  |
| Standing wave characteristic | 115 | 115 | 120 | 100 |
| Durability | o | o | o | o |
| Cornering force | 100 | 70 | 100 | 100 |

TABLE 3

|  |  | (ply composition) | | | | |
| --- | --- | --- | --- | --- | --- | --- |
|  | Symbol | A | B | C | D | E |
| Carcass | Number of plies | 6 | 6 | 6 | 6 | 6 |
|  | Material of cord | NYLON 6,6 | NYLON 6,6 | NYLON 6,6 | NYLON 6,6 | NYLON 6,6 |
|  | Diameter of cord | 1890d/3 | 1890d/3 | 1890d/3 | 1890d/3 | 1890d/3 |
|  | Number of twist of cord (twists/100 mm) | 26 | 34 | 34 | 36 | 23 |
|  | $S_5$ (%) | 6.2 | 7.7 | 7.7 | 8.0 | 4.5 |
|  | $S_{10}$ (%) | 9.5 | 11.7 | 11.7 | 12.1 | 7.5 |
|  | $S_{20}$ (%) | 14.7 | 17.5 | 17.5 | 18.3 | 11.2 |
|  | $D_5$ (%/d) × $10^{-4}$ | 9.84 | 11.32 | 11.32 | 11.43 | 7.32 |
|  | $D_{10}$ (%/d) × $10^{-4}$ | 15.08 | 17.29 | 17.20 | 17.20 | 12.20 |
|  | $D_{20}$ (%/d) × $10^{-4}$ | 23.33 | 25.74 | 25.74 | 26.14 | 16.00 |
|  | Elongation at breakage (%) | 24.8 | 26.8 | 26.8 | 27.2 | 19.6 |
|  | Tension of cord (kg) | 48.2 | 43.8 | 43.8 | 42.5 | 54.0 |
|  | Initial elasticity (kg/mm$^2$) | 175 | 145 | 145 | 140 | 270 |
| Belt | Number of plies | 8 | 8 | 8 | 8 | 8 |
|  | Material of cord | NYLON 6,6 | NYLON 6,6 | NYLON 6,6 | NYLON 6,6 | NYLON 6,6 |
|  | Diameter of cord | 1680d/4 | 1680d/4 | 1680d/4 | 1680d/4 | 1680d/4 |
|  | $S_5$ (%) | 4.8 | 4.8 | 4.8 | 4.8 | 4.1 |
|  | $S_{10}$ (%) | 8.2 | 8.2 | 8.2 | 8.2 | 6.8 |
|  | $S_{20}$ (%) | 11.3 | 11.3 | 11.3 | 11.3 | 9.7 |
|  | $D_5$ (%/d) × $10^{-4}$ | 6.03 | 6.03 | 6.03 | 6.03 | 5.38 |
|  | $D_{10}$ (%/d) × $10^{-4}$ | 9.36 | 9.36 | 9.36 | 9.36 | 8.72 |
|  | $D_{20}$ (%/d) × $10^{-4}$ | 14.49 | 14.49 | 14.49 | 14.49 | 12.44 |
|  | Elongation at breakage (%) | 22.4 | 22.4 | 22.4 | 22.4 | 17.2 |
|  | Tension of cord (kg) | 52.5 | 52.5 | 52.5 | 52.5 | 56.5 |
|  | Initial elasticity (kg/mm$^2$) | 234 | 234 | 234 | 234 | 320 |
|  | Number of cut breaker plies | 2 | 2 | 0 | 2 | 2 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A high-speed radial tire for heavy load comprising a tread part, a pair of side-wall parts, a pair of bead parts, each of said pair of bead parts having a bead core disposed therein, a carcass composed of an inner layer extending from a tread part through each of said pair of side-wall parts and folded from inside to outside around each of said pair of bead cores and an outer layer arranged on the inner layer and folded from outside to inside so as to surround a folded part of the inner layer, each of the inner and the outer layer being composed of at least one carcass ply which has carcass cords inclined at an angle of 70 to 90 degrees against the tire's equator, and a belt layer composed of a plurality of belt plies of belt cords which are placed outside in the radial direction of the carcass and inside the tread part, wherein:

in a state of being mounted on a standard rim and inflated with a standard internal pressure, the equator height (H1), defined as a height in the radial direction of a crossing point at which the inner surface of the belt layer in the radial direction intersects the surface of the tire's equator, is larger than the outer end height (H2), defined as a height in the radial direction at the outermost end of the inner surface of the belt layer in the tire's axis direction; and the belt camber quantity (H) defined as the difference (H1−H2) between the equator height (H1) and the outer end height (H2) is set at 7% to 11% of the belt width (W) defined as a length between the outer ends of the inner surface of the belt layer in the tire's axis direction:

each of said carcass cords having a divided value D5 of the stretch S5 upon loading with 5 kg divided by the actual total denier number d of the cord of $7.35 \times 10^{-4}$%/d to $14.7 \times 10^{-4}$%/d, a divided value $D_{10}$ of the stretch $S_{10}$ upon loading with 10 kg divided by the actual total denier number d of the cord of $13.2 \times 10^{-4}$%/d to $22.1 \times 10^{-4}$%/d, a divided value $D_{20}$ of the stretch $S_{20}$ upon loading with 20 kg divided by the actual total denier number d of the cord of $20.6 \times 10^{-4}$%/d to $29.4 \times 10^{-4}$%/d; and the stretch ratio of said carcass cord decreasing smoothly as the load increases.

2. A high-speed radial tire for heavy load comprising a tread part, a pair of side-wall parts, a pair of bead parts, each of said pair of bead parts having a bead core disposed therein, a carcass composed of an inner layer extending from said tread part through each of said pair of side-wall parts and folded from inside to outside around each of said pair of bead cores and an outer layer arranged on the inner layer and folded from outside to inside so as to surround a folded part of the inner layer, each of the inner and the outer layer being composed of at least one carcass ply which has carcass cords inclined at an angle of 70 to 90 degrees against the tire's equator, and a belt layer composed of a plurality of belt plies of belt cords which are placed outside in the radial direction of the carcass and inside the tread part, wherein:

in a state of being mounted on a standard rim and inflated with a standard internal pressure, the equator height (H1), defined as a height in the radial direction of a crossing point at which the inner surface of the belt layer in the radial direction intersects the surface of the tire's equator, is larger than the outer end height (H2), defined as a height in the radial direction at the outermost end of the inner surface of the belt layer in the tire's axis direction; and the belt camber quantity (H) defined as the difference (H1−H2) between the equator height (H1) and the outer end height (H2) is set at 7% to 11% of the belt width (W) defined as a length between the outer ends of the inner surface of the belt layer in the tire's axis direction:

each of said carcass cords having a stretch $S_5$ upon loading with 5 kg of 5% to 10%, a stretch $S_{10}$ upon loading with 10 kg of 9% to 15%, and a stretch $S_{20}$ upon loading with 20 kg of 14% to 20%;

each of said carcass cords has a divided value $D_5$ of the stretch $S_5$ upon loading with 5 kg divided by the actual total denier number d of the cord of $7.35 \times 10^{-4}\%/d$ to $14.7 \times 10^{-4}\%/d$; a divided value $D_{10}$ of the stretch $S_{10}$ upon loading with 10 kg divided by the actual total denier number d of the cord of $13.2 \times 10^{-4}\%/d$ to $22.1 \times 10^{-4}\%/d$; and a divided value $D_{20}$ of the stretch $S_{20}$ upon loading with 20 kg divided by the actual total denier number d of the cord of $20.6 \times 10^{-4}\%/d$ to $29.4 \times 10^{-4}\%/d$; and the stretch ratio of said carcass cord decreasing smoothly as the load increases.

3. The high-speed radial tire for a heavy load according to claim 2, wherein each of said belt plies has belt cords inclined at an angle of 5 degrees or less against the tire's equator, and a cut breaker having sub-cords inclined at an angle of 5 degrees or more and 40 degrees or less and provided inside or outside of said belt layer in the radial direction.

4. The high-speed radial tire for heavy load according to claim 2, wherein each of said carcass cords has the stretch $S_5$ upon 5 kg loading of 5% to 8%.

5. The high-speed radial tire for heavy load according to claim 2, wherein each of said belt cords has a divided value $D_5$ of the stretch $S_5$ upon loading with 5 kg divided by the actual total denier number d of the cord of $3.85 \times 10^{-4}\%/d$ to $7.69 \times 10^4$; $\%/d$; a divided value $D_{10}$ of the stretch $S_{10}$ upon loading with 10 kg divided by the actual total denier number d of the cord of $6.41 \times 10^{-4}\%/d$ to $10.26 \times 10^{-4}\%/d$; and a divided value $D_{20}$ of the stretch $S_{20}$ upon loading with 20 kg divided by the actual total denier number d of the cord of $10.26 \times 10^{-4}\%/d$ to $17.59 \times 10^{-4}\%/d$.

6. The high-speed radial tire for heavy load according to claim 3, wherein each of said belt cords has the stretch $S_5$ upon 5 kg loading of 3% to 6%.

* * * * *